United States Patent
Leukert-Knapp et al.

(10) Patent No.: US 7,409,430 B2
(45) Date of Patent: *Aug. 5, 2008

(54) NOTIFICATION MESSAGE DISTRIBUTION

(75) Inventors: Andreas Leukert-Knapp, Heidelberg (DE); Joachim Becker, Wiesloch (DE)

(73) Assignee: SAP AG, Walldorf (DE)

( * ) Notice: Subject to any disclaimer, the term of this patent is extended or adjusted under 35 U.S.C. 154(b) by 734 days.

This patent is subject to a terminal disclaimer.

(21) Appl. No.: 10/469,336

(22) PCT Filed: Feb. 27, 2002

(86) PCT No.: PCT/EP02/02113

§ 371 (c)(1), (2), (4) Date: Aug. 27, 2003

(87) PCT Pub. No.: WO02/073478

PCT Pub. Date: Sep. 19, 2002

(65) Prior Publication Data
US 2004/0098459 A1  May 20, 2004

(51) Int. Cl.
G06F 15/16 (2006.01)

(52) U.S. Cl. .................. 709/207; 709/206; 709/223

(58) Field of Classification Search ......... 709/206–207, 709/223–226
See application file for complete search history.

(56) References Cited

U.S. PATENT DOCUMENTS

| 5,548,753 | A  |   | 8/1996  | Linstead et al. |
| 5,748,884 | A  |   | 5/1998  | Royce et al. |
| 5,754,111 | A  |   | 5/1998  | Garcia |
| 5,786,755 | A  |   | 7/1998  | Cicchino et al. |
| 6,067,548 | A  | * | 5/2000  | Cheng .................. 707/101 |
| 6,092,102 | A  | * | 7/2000  | Wagner ................ 709/224 |
| 6,157,941 | A  |   | 12/2000 | Verkler et al. |
| 6,161,139 | A  | * | 12/2000 | Win et al. ............ 709/225 |
| 6,185,603 | B1 |   | 2/2001  | Henderson et al. |
| 6,202,066 | B1 | * | 3/2001  | Barkley et al. .......... 707/9 |
| 6,347,330 | B1 |   | 2/2002  | Dawson et al. |
| 6,725,445 | B1 | * | 4/2004  | Leymann et al. ...... 709/207 |
| 6,751,657 | B1 | * | 6/2004  | Zothner ................ 709/206 |
| 6,757,357 | B1 | * | 6/2004  | Horton et al. ........ 379/9.03 |
| 6,766,368 | B1 | * | 7/2004  | Jakobson et al. ...... 709/224 |
| 6,772,167 | B1 | * | 8/2004  | Snavely et al. ....... 707/102 |
| 6,775,658 | B1 | * | 8/2004  | Zothner ................ 709/203 |
| 6,857,017 | B1 | * | 2/2005  | Faour et al. .......... 709/224 |

(Continued)

OTHER PUBLICATIONS

"Process Control Framework: Connecting Systems & Corporate Cultures," 2000, *Process Solutions AG*, 8 pages, 5 pages of English translation.

(Continued)

*Primary Examiner*—Philip B Tran
(74) *Attorney, Agent, or Firm*—Fish & Richardson P.C.

(57) ABSTRACT

In a computer system, peripheral computers with business applications send alert messages to a central computer when a current variable exceeds a reference value. The central computer implements an alert server to notify a target group of multiple users via communication devices. The central computer escalates further notification to a supervisor user in the event that during a predetermined time period no user of the group has confirmed reception. The notifications have predefined fixed and variable text portion that relate to the alert type. The group of users to be notified is determined by subscription or by a role-to-application assignment.

17 Claims, 6 Drawing Sheets

TABLE 110 ROLE - TO - USER ASSIGNMENT

|        | ROLE 1 | ROLE 2 | ROLE 3 | ROLE r | ... | ROLE R |
|--------|--------|--------|--------|--------|-----|--------|
| USER 1 | +      | +      | +      |        |     | +      |
| USER 2 | +      | +      |        |        |     | +      |
| USER 3 | +      |        | +      |        |     |        |
| USER u |        |        |        |        |     |        |
| ...    |        |        |        |        |     |        |
| USER U | +      |        |        |        |     | +      |

TABLE 120 BA - TO - USER - ASSIGNMENT

|        | BA 201 | BA 202 | BA 203 | BA 20p | ... | BA 20P |
|--------|--------|--------|--------|--------|-----|--------|
| ROLE 1 | +      |        | +      |        |     |        |
| ROLE 2 | +      |        | +      |        |     | +      |
| ROLE 3 |        | +      | +      |        |     |        |
| ROLE r |        |        |        |        |     |        |
| ...    |        |        |        |        |     |        |
| ROLE R | +      |        |        |        |     | +      |

TABLE 130 ALERT TYPES FOR APPLICATION 201

|        | TYPE 1 | TYPE 2 |
|--------|--------|--------|
| ROLE 1 | +      |        |
| ROLE 2 |        | +      |
| ROLE 3 | +      |        |
| ROLE r |        |        |
| ...    |        |        |
| ROLE R | +      |        |

U.S. PATENT DOCUMENTS

| | | | |
|---|---|---|---|
| 6,985,955 B2* | 1/2006 | Gullotta et al. | 709/223 |
| 7,032,006 B2* | 4/2006 | Zhuk | 709/206 |
| 7,185,192 B1* | 2/2007 | Kahn | 707/102 |
| 2004/0064552 A1* | 4/2004 | Chong et al. | 709/224 |

OTHER PUBLICATIONS

Geissbühler et al., "Design of a General Clinical Notification System Based on the Publish-Subscribe Paradigm," 1997 AMIA Annual Fall Symposium, A Conference of the American Medical Informatics Association, Proceedings of 1997 AMIA Annual Fall Symposium: The Emergence of Internetable Health Care Systems that Really Work, Nashville, TN, USA, Oct. 25-27, 1997, pp. 126-130, XP002179981.

Breed et al., "The Spacecraft Emergency Response System (SERS) For Autonomous Mission Operations," 3rd International Symposium on Reducing the Cost of Spacecraft Ground Systems and Operations, Mar. 1999, pp. 1-8, XP002179982.

* cited by examiner

TABLE 110 ROLE - TO - USER ASSIGNMENT

|        | ROLE 1 | ROLE 2 | ROLE 3 | ROLE r | ... | ROLE R |
|--------|--------|--------|--------|--------|-----|--------|
| USER 1 | +      | +      | +      |        |     | +      |
| USER 2 | +      | +      |        |        |     | +      |
| USER 3 | +      |        | +      |        |     |        |
| USER u |        |        |        |        |     |        |
| ...    |        |        |        |        |     |        |
| USER U | +      |        |        |        |     | +      |

TABLE 120 BA - TO - USER - ASSIGNMENT

|        | BA 201 | BA 202 | BA 203 | BA 20p | ... | BA 20P |
|--------|--------|--------|--------|--------|-----|--------|
| ROLE 1 | +      |        | +      |        |     |        |
| ROLE 2 | +      |        | +      |        |     | +      |
| ROLE 3 |        | +      | +      |        |     |        |
| ROLE r |        |        |        |        |     |        |
| ...    |        |        |        |        |     |        |
| ROLE R | +      |        |        |        |     | +      |

TABLE 130 ALERT TYPES FOR APPLICATION 201

|        | TYPE 1 | TYPE 2 |
|--------|--------|--------|
| ROLE 1 | +      |        |
| ROLE 2 |        | +      |
| ROLE 3 | +      |        |
| ROLE r |        |        |
| ...    |        |        |
| ROLE R | +      |        |

FIG. 6

USER LIST 140

APPLICATION 201
USER 1
USER 2
USER 3
USER U

APPLICATION 202
USER 1
USER U

MODIFIED USER LIST 140'

APPLICATION 201

USER 1
USER 2

USER U

APPLICATION 202

USER U

FIG. 7

NOTIFICATION MESSAGE DISTRIBUTION

CROSS REFERENCE TO RELATED APPLICATIONS

This application is a National Stage application under 35 U.S.C. § 371 that claims the benefit of PCT/EP02/02113, filed Feb. 27, 2002, which claims the benefit of EP Application No. 01104875.8, filed Feb. 28, 2001.

FIELD OF THE INVENTION

The present invention generally relates to data processing and, more particularly, relates to business application computer systems, programs, and methods that use alert messages.

BACKGROUND OF THE INVENTION

Distributed computer networks that execute business applications support business organizations. Situations that are critical and important for the organization can occur at any time inside or outside the organization. Often, the situations are unexpected. The applications generate alerts to inform one or more users about the situation, for example: A customer relation management (CRM) application reports that a key customer terminates a contract. A production planning application reports delivery problems for an important order. A business analysis application detects a decline in revenue. A computer system monitor points out insufficiency of resources and informs about an expected memory overflow. For alert systems, the following references are useful: U.S. Pat. No. 6,185,603 to Henderson et al., U.S. Pat. No. 6,157,941 to Verkler et al., U.S. Pat. No. 5,748,884 to Royce et al., U.S. Pat. No. 5,786,755 to Cicchino et al., U.S. Pat No. 5,754,111 to Garcia, U.S. Pat. No. 5,548,753 to Linstead et al.

Further: GEISSBÜHLER A ET AL: "Design of a general clinical notification system based on the publish-subscribe paradigm" 1997 Amia Annual Fall Symposium. A Conference Of The American Medical Informatics Association. Proceedings, Proceedings Of 1997 Amia Annual Fall Symposium The Emergence Of Internetable Health Care Systems That Really Work, Nashville, Tenn, USA, 25-29 0, 25-29 October 1997, pages 126-130, XP002179981 1997, Philadelphia, Pa., USA, Hanley & Belfus, USA.

Further: J. BREED ET AL.: "The Spacecraft Emergency Response System (SERS) For Autonomous Mission Operations" 3RD INTERNATIONAL SYMPOSIUM ON REDUCING THE COST OF SPACECRAFT GROUND SYSTEMS AND OPERATIONS, [Online] March 1999 (1999-03), pages 1-8.

Geissbühler et al. discusses a publish-subscribe paradigm as a mechanism providing a framework for the exchange of data between independent applications in an event-driven manner. The paradigm is used in the context of a clinical notification system. Escalation is incorporated.

Royce et al. as well as Breed et al. discuss event-based notification systems arranged to support escalation procedures.

Business applications can be configured to provide electronic notifications to a single recipient or to a group of recipients (cf. Linstead et al.). There is a technical problem relating to the configuration of the business application notification system to select a specific target group that receives alert notifications from a particular business application.

BRIEF DESCRIPTION OF THE DRAWINGS

FIG. 6 illustrates assignment tables for providing a message distribution list according to the present invention; and FIG. 7 illustrates the message distribution list.

DETAILED DESCRIPTION OF THE INVENTION

Figure 1:
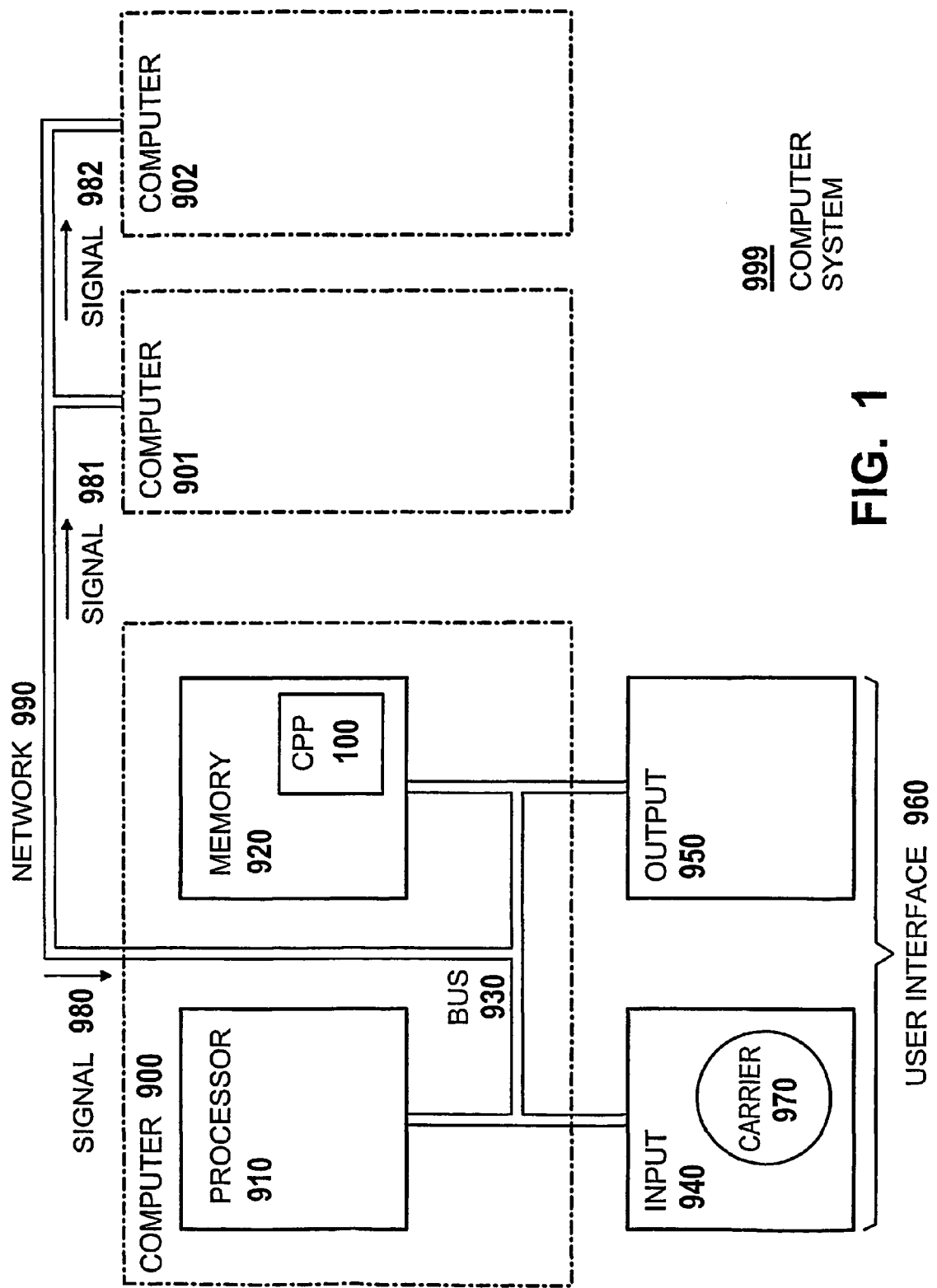
FIG. 1 illustrates a simplified block diagram of a computer network system according to the present invention, the system having a central computer, peripheral computers, and communication devices.

In a computer system (999), peripheral computers (901/902) with business applications (201/202) send alert messages (211/212) to a central computer (900), for example, when a current variable exceeds a reference value. The central computer implements an alert server to notify (301) a target group of users (1, 2, 3) via communication devices (903, 904, 905). The central computer escalates further notifications (321) to a supervisor user (4) in the event that during a predetermined time period no user of the group has confirmed reception. The notifications (301, 321) have predefined fixed and variable text portions that relate to the alert type. The group of users to be notified is determined by subscription and a role-to-application assignment.

FIG. 1 illustrates a simplified block diagram of computer network system 999 having a plurality of computers 900, 901, 901 (or 90$q$, with q=0 . . . Q-1, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0 only) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk-DVD); (c) semiconductor media, like DRAM, SRAM, EPROM, EEPROM, or memory stick.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in system network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are know, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
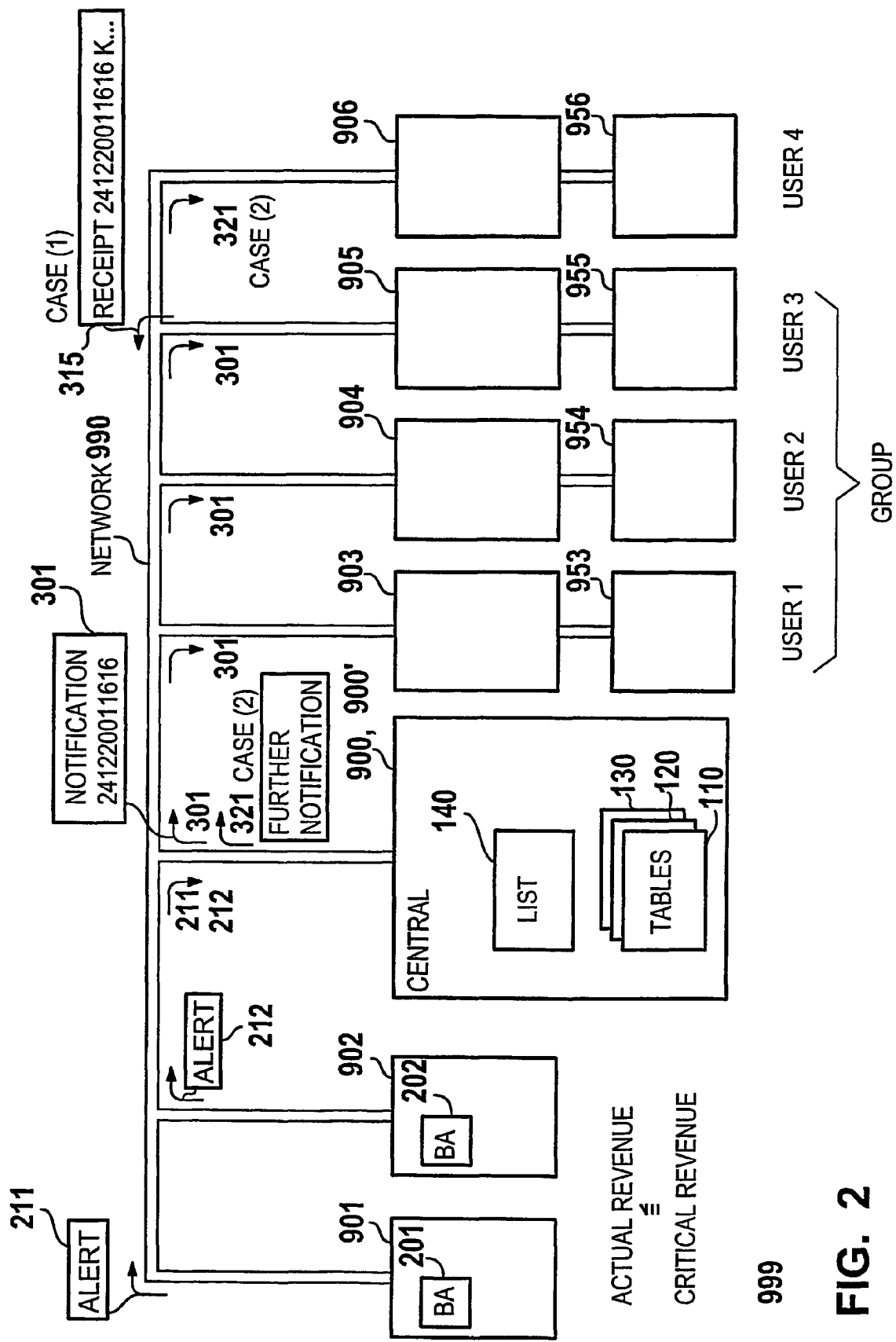
FIG. 2 illustrates a simplified block diagram of the computer network system of FIG. 1 with further details of the central computer, the peripheral computers, and the communication devices.

FIG. 2 illustrates a simplified block diagram of the computer network system of FIG. 1 with details of the central computer, the peripheral computers, and the communication devices.

Computer system 999 of the present invention has central computer 900 and at least one peripheral computer 901/902. Communication devices 903-906 are also computers. As explained in FIG. 1, computers 90n are coupled via network 990. In FIG. 2, messages and their preferred way in network 990 are illustrates by boxes and arrows. The use of singular language and of the forward slash "/" to describe elements like "computer" stands for "at least one" but indicates that in a preferred embodiment multiple elements are used.

Peripheral computer 901/902 executes at least one business application (BA) 201/202. As used herein, the term "application" stands for an application computer program. Peripheral computer 901/902 further issues alert message 211/212 ("ALERT") when a current value of a predetermined variable in business application 201/202 is in a predetermined relation to a reference value. Central computer 900 receives alert message 211/212 and, according to a predefined type of alert message 211/212 (e.g., business type), forwards notification message 301 to communication devices 903, 904 and 905 that present a representation (cf. FIG. 4, 301-1) of notification message 301 to a predefined group of multiple original users (e.g., users 1, 2, 3, "GROUP").

Computer system 999 with central computer 900, after having forwarded notification message 301, issues further notification message 321 (cf. FIG. 5) to a further user (e.g., user 4) outside the group in the event that during a predetermined time period (cf. FIG. 3, T) no user of the group has confirmed reception of notification message 301 (case (2)).

Original and further users are listed in message distribution list 140 (illustrated in computer 900). The inclusion of users to list 140 (or exclusion) according to the present invention is discussed below in connection with tables 110, 120, and 130 and FIG. 6.

Central computer 900 is conveniently implemented as workplace application server 900' by that the users of the group interact with applications 201/202 (running on peripheral computer 901/902). I/O devices of computers 901 and 902 are shown in FIG. 1 but are omitted in FIG. 2 for simplicity.

In computer 901/902, the predefined relation between current and reference values is detected, preferably, by comparing absolute values, so that the relation is a "larger than" or "smaller than" relation. It is also possible to monitor the current values over a time period to detect either an increase or a decrease that is larger (or smaller) than a reference increase or a reference decrease, respectively.

Figure 3:
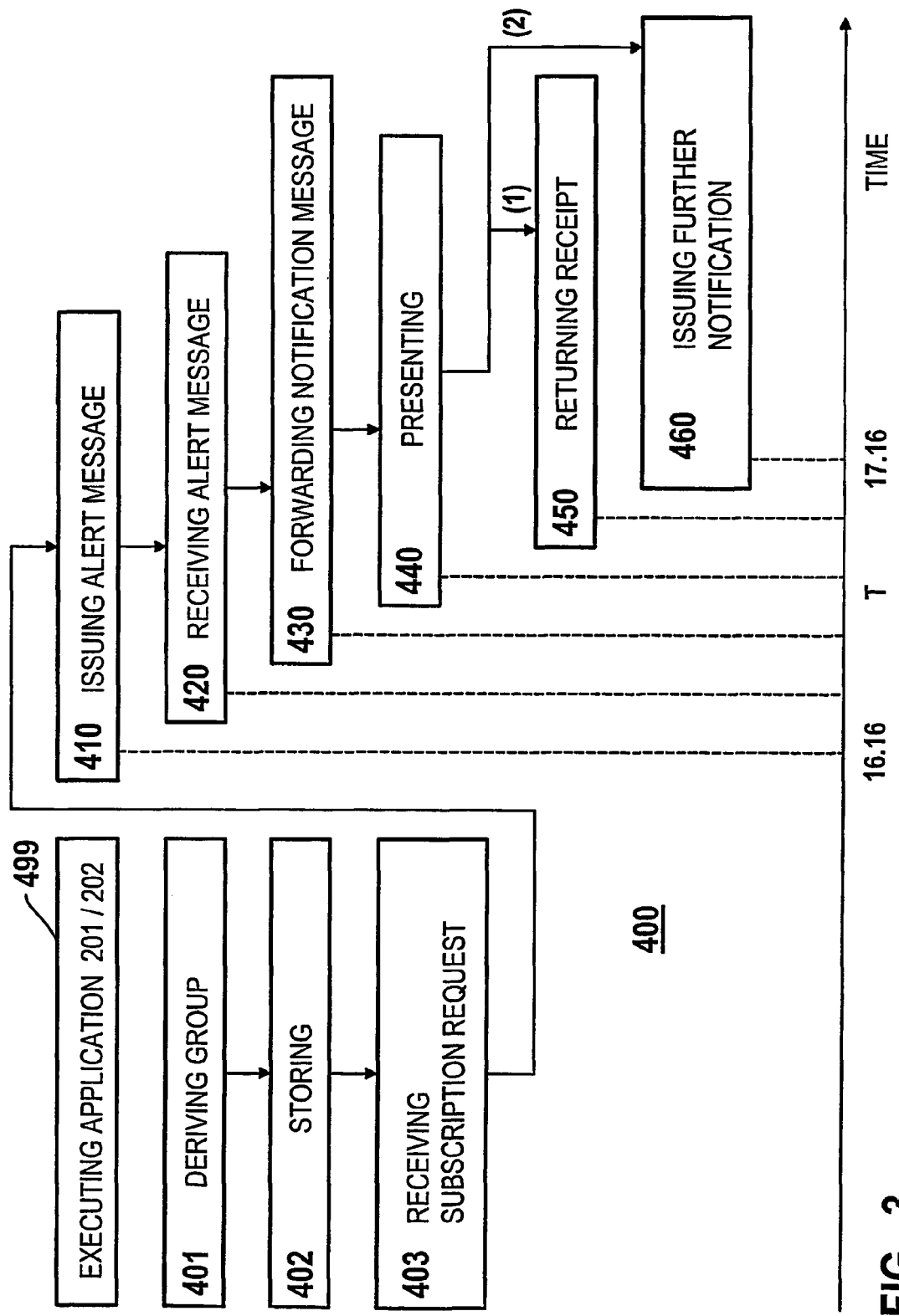
FIG. 3 illustrates the operation of the system of FIGS. 1-2 according to the present invention as a method in a simplified time and flow-chart diagram.

In the example of FIG. 3, computer 901/902 monitors the "revenue" as the predetermined variable in business application 201/202. Computer 901/902 issues alert message 211/212 when the "actual revenue" (i.e., current value) is smaller than or equal to critical revenue (i.e., reference value). Hence, the notification message has "low revenue" or similar content, (cf. FIG. 4, 301-1).

Issuing further notification message 321 to a further user is, preferably, provided by forwarding further notification message 321 to further communication device 906. Device 906 presents a further representation (cf. FIG. 5) of notification message 321 to the further user. Although the present invention is conveniently explained with dedicated communication devices for each user, the present invention can also be implemented with a single communication device, such as a large signboard visible for all users.

When instructed by the user, any communication device returns a receipt message to central computer 900 (case (1)). As illustrated in FIG. 2, device 905 is the confirming device that returns receipt message 315, devices 903 and 904 are non-confirming devices.

Communication device 903-906 is, for example, a fax machine ("facsimile"), a voice mail system, a selective call receiver ("pager"), a mobile phone with short message service (SMS) receiver, an audio device (e.g., a text-to-voice converter with speaker) or any other technical apparatus, such as a conventional personal computer (PC, e.g., with electronic mail, or pop-up function, or unified message function), that communicates to a user.

Preferably, communication device 903-906 presents the representations of notification 301/321 visually, for example, by displays 953, 954, 955, 956. For visualizing, devices 903-906 are conveniently implemented to run browser programs, such as HTML-browser in a PC or WAP-browser on a mobile phone. Optionally, device 903-906 can present also audible.

Conveniently, central computer goo assigns a unique message identification (MID) number to notification message 301, and confirming communication device 905 returns this identification number as part of receipt message 315. In FIG. 2, the MID number is "241220011616" and is derived from data and time of alert (e.g., Dec. 24, 2001, 16.16 hours).

Preferably, confirming communication device 315 also returns user identification (e.g., the name of user 3: "K . . . "). Convenient for tracing purposes, central computer 900 optionally stores the user identification.

Messages are, preferably, coded in extensible markup language (XML).

FIG. 3 illustrates the operation of system 999 of the present invention as method 400 in a simplified time and flow-chart diagram. Method steps 410-460 are explained in boxes. Dashed lines to the time axis indicate a preferred sequence of events; plain arrows indicate a preferred method flow. At the top of the figure, box 499 indicates that computer 901/902 optionally execute application 201/202 continuously. It is an advantage that feeding back alert information to peripheral computer 901/902 is not required.

Method 400 comprises issuing alert message 410, receiving alert message 420, forwarding notification message 430, presenting 440, as well as either returning receipt 450 in case (1) or issuing further notification message 460.

In step 410, peripheral computer 901/902 issues alert message 211/212 going to central computer 900. In step 420, central computer 900 receives alert message 211/212. In step 430, central computer 430 forwards notification message 301 to communication devices 903-905 (e.g., at 16.16 hours). In step 440, communication device 903-905 presents the representation of message 301 to the users 1, 2, 3 (details in FIG. 4). In step 450, communication device 905 returns receipt 450 (case (1)). In step 460—in the absence of any receipt after T (e.g., one hour later at 17.16), central computer 900 issues further notification message 321, this time to user 4 (details in FIG. 5).

In other words, alert notification method 400 comprising that central computer 900 performs the following steps:

receiving 420 an alert message issued (cf. step 410) by peripheral computer 901/902 that executes business application 201/202 and that detects that a current value of a predetermined variable in the business application is in a predetermined relation to a reference value;

forwarding 430 notification message 301 to a plurality of communication devices 903, 904, 905 that present (cf. step 440) a representation of the notification to a group of users (e.g., users 1, 2, 3); and issuing 460 a further notification message to a further user outside the group (e.g., user 4) in the event that during a predetermined time period no user of the group has confirmed reception of notification message 301 by receipt message 315.

In method 400, further steps 401, 402 and 403 allow the management of the message distribution list (cf. 140 in FIG. 7) by computer 900. Preferably, steps 401, 402 and 403 are executed prior to steps 410-460. This is convenient, but not essential, updating the list is possible. In deriving user group step 401, the group of users is derived from a role-to-user assignment and from an application-to-role assignment (details in FIG. 6), wherein the assignments define the business application that each user is allowed to access. In storing representations step 402, representations of the group of users are stored in the message distribution list (cf. 140 in FIG. 7). In receive subscription requests step 403, the list is modified.

Figure 4:
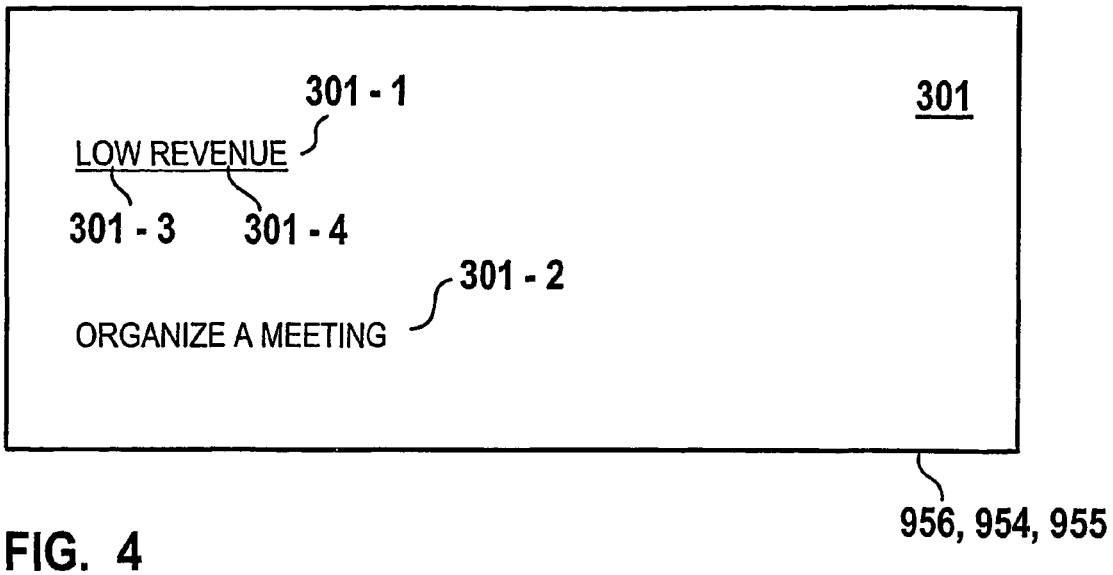
FIG. 4 illustrates a display of a communication device with a notification message issued by the central computer.

FIG. 4 illustrates display 953/954/955 of communication device 903/904/905 with notification message 301 issued by central computer 900. The representation of message 301 is conveniently hyperlink 301-1 (e.g., "LOW REVENUE") to a full version of notification message 301. The text of hyperlink 301-1 can be composed by text portions (details below). Not illustrated in the figures, because hyper-linking is well known in the art, the full text is stored, for example, in memory 920 of computer 900 (cf. FIGS. 1-2) and could read, for example, as:

"The actual revenue went below the critical revenue". Optionally, computer 900 (i.e. workplace application server 900') adds follow-up suggestion 301-2, such as, for example: "ORGANIZE A MEETING", taken, for example, from a look-up table.

Preferably, notification message 301 comprises predefined text portions 301-3 and 301-4. In the example, 301-4 "REVENUE" is fixed and points to the type of application 201/202 where the alert originates (e.g., application that evaluates revenue); and 301-3 "LOW" is alert specific and could also be "HIGH". The predefined message texts are assigned to the particular business application; in other words, for each type of business application, particular text portions are defined.

Optionally, the message text (short of full versions) has placeholder for business variables that are updated when computer 900 generates message 301. For example, The natural language of the predefined message can automatically be selected according to user attributes, stored in computer 900 or communication devices 903-905. In the event that the description is translated into German, the text could read as "NIEDRIGES EINKOMMEM—MEETING ORGANISIEREN".

Using hyperlinks is convenient, for example, to shield unauthorized persons from the full information about the alert. Optionally, computer 900 forwards the full version of message to device 905 only after having confirmed the identity of user 3 as being authorized. Displaying the full version on the same device as the short version (the hyperlink) is convenient, but not necessary. The user reacting on the hyperlink can cause computer 900 to re-direct the full version to a different communication device.

Optionally, computer 900 forwards notification messages with short text and with full text to different communication devices. For example, computer 900 forwards short texts as SMS to a mobile phone and—simultaneously or on request by the user—computer 900 forwards full texts as electronic mail.

Figure 5:
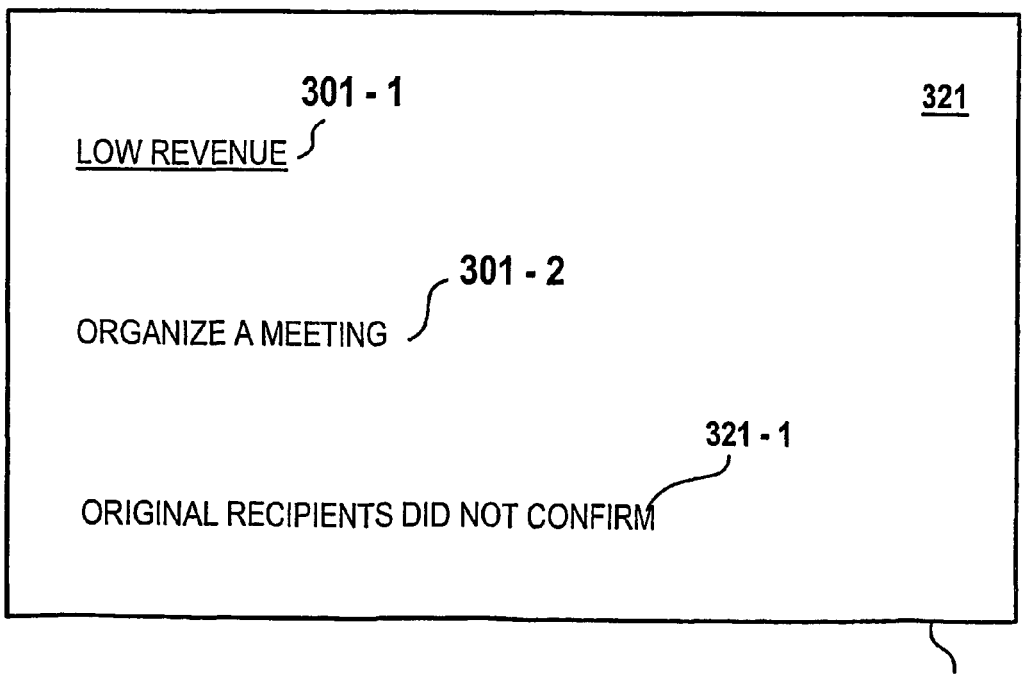
FIG. 5 illustrates a display of a further communication device with a further notification message issued by the central computer.

FIG. 5 illustrates display 956 of communication device 906 with further notification message 321 issued by central computer 900. Preferably, message 321 cites message 301 (with link 301-1 and suggestion 301-2 in FIG. 4). Message 321 has descriptive portion 321-1 to indicate that message 321 is a further notification. For example, portion 321-1 could read as: "Original recipients did not confirm".

The above explanation assumed that the group of users to be notified (e.g., original users 1, 2, 3, further user 4) is predetermined. It is possible that all users of system 999 (computers 901, 902, 903) are notified. But it is desired to keep the overall number of users in the message distribution list small. In other words, the list should comprise only these users for that alert information is relevant. The distribution list can optionally distinguish between original and further users; but for convenience, the following explanation does not distinguish original and further users. Computer 900 creates the distribution list after receiving alert message 211/212 (dynamic creation in real-time), or before (static creation). Details are explained in connection with FIG. 3, steps 401-403, and FIGS. 6-7. The present invention thereby takes advantage of existing user-to-role and role-to-application assignments. Computer 900 combines the existing assignments with the alert scheme described above. Optionally, the distribution list is provided according to one or more of the following approaches:

(1) Application 201/202 determines the users, for example, by evaluating an organizational structure that is part of the application, or by reading from a customized distribution list. In this case, application 201/202 includes its own distribution list into alert message 211/212.

(2) Users are invited to subscribe or to un-subscribe to alert notifications. In combination with creating the distribution list, the users can modify the distribution list (set as default list). An example is explained in connection with FIG. 7.

FIG. 6 illustrates assignment tables 110, 120, 130 for providing the message distribution list (140, cf. FIG. 3) of the present invention. FIG. 7 illustrates message distribution list 140 with more detail.

Workplace 900' stores assignment tables, preferably, in memory 920. For convenience of explanation, the tables are illustrated here as matrices, wherein a matrix element with a plus symbol stands for an existing assignment.

First assignment table 110 provides a role-to-user assignment. R roles (r=1 . . . R) are selectively assigned to U users (u=1 . . . U). For example, USER 1 belongs to ROLES 1, 2, 3 and R; USER 2 belongs to ROLE 1, 2 and R, and so on.

Second assignment table 120 provides a business-application-to-role assignment. Business applications (BA) 20$p$ (p=1 . . . P, BA 201 and 201 cf. FIG. 2) are selectively assigned to R roles. For example, ROLE 1 belongs to application 201 and 202, 203 and 20P; ROLE 2 belongs to application 201, 203 and 20P, etc. Roles are, for example, Chief Financial Officer, Employee, Sales Representative, and Accountant.

Combining tables 110 and 120 creates distribution list 140 (cf. steps 401 and 402 in FIG. 3). For example, distribution list 140 for application 201 is obtained as comprising users in roles 1, 2 and R (table 120), these users are USER 1, 2, 3 and U. Likewise, distribution list 140 for application 202 is obtained as comprising users in roles 1, 3 and R (table 120); these users are USER 1 and USER 3.

It is further convenient to further limit the number of users in distribution list 140. Third assignment table 130 provides alert-type-to-role assignment. Inside a single application, alert types TYPE a (a=1 . . . A) are selectively assigned to R roles. For example, application 201 might create an alert of technical nature, such as an expected memory overflow, that alert is notified to technicians; application 201 might also create an alert of a business nature, such as the revenue alert (cf. FIGS. 2, 4-5), that alert is notified to business persons. Alert types are sometimes referred to as "alert categories".

For convenience, the figures show alert types of BA 201 only. In the alternative, a similar list can be provided for an alert type-to-user assignment.

In other words, the predefined group of users is determined in distribution list 140 that is derived from a role-to-user assignment and from an application-to-role assignment, wherein the assignments (110, 120, 130) define the business application that each user is allowed to access.

As mentioned, users can be invited to subscribe or unsubscribe to alert notifications, cf. step 403 in FIG. 3. FIG. 7 further illustrates modified distribution list 140', in the example, user 3 has un-subscribed from being notified about alerts in application 201, und user 1 has un-subscribed from being notified about alerts in application 202. Lists 140 and 140' store representations of the group of users and receive (step 403) subscription requests to alert notification messages from the users of the group. Subscription requests can be a request to cancel an existing notification (as illustrated) or, can be a request to establish a new notification. In other words, subscription requests selectively add and remove representations of users from distribution list 140. Persons of skill in the art are able to use assignment tables 110 and 120 to let computer 900 selectively allow or reject such requests. In other words, the possibility of a user to request is related to the role.

Summarizing the present invention, it relates to computer program product 100 with program instructions for processor 910 in central computer 900 (central computer 900 coupled to computer 901/902 that executes business application 201/202, peripheral computer 901/902 issuing alert message 211/212 when a current value of a predetermined variable in the business application is in a predetermined relation to a reference value), central computer 900 receiving alert message 201/202, CPP 100 is characterized in that the program instructions cause processor 910 of computer 900 to execute the following: upon receiving 420 alert message 211/212, forwarding 430 notification message 301 to communication devices 903, 904, 905 that present 440 a representation of notification 301 to a group of users 1, 2, 3; and issuing 460 further notification message 321 to a further user 4 outside the group in the event that during predetermined time period T no user of the group has confirmed reception of notification 301 by a receipt message 315.

CPP 100 causes processor 910 to derive 401 the group of users from a role-to-user assignment and from an application-to-role assignment. Preferably, CPP 100 causes processor 910 to store 402 representations of the group of users in message distribution list 140 and to receive 403 subscription requests to alert notification messages from the users of the group. Again, as mentioned above, CPP 100 can be embodied in signal 980 and on carrier 970.

The invention claimed is:

1. A computer system having a central computer and at least one peripheral computer for executing at least one business application, the peripheral computer further issuing an alert message when a current value of a predetermined variable in the business application is in a predetermined relation to a reference value, the central computer for receiving the alert message and, according to a predefined type of the alert message, for forwarding a notification message to communication devices that present a representation of the notification message to a predefined group of users;

in the computer system, the central computer issuing a further notification message to a further user outside the group in the event that during a predetermined time period no user of the predefined group has confirmed reception of the notification, the computer system characterized in that the predefined group of users is determined from a message distribution list that is derived from a role-to-user assignment and from an application-to-role assignment, wherein the assignments define the business application that each user is allowed to access.

2. The computer system of claim 1, wherein the communication device, when instructed by the user, returns a receipt message to the central computer.

3. The computer system of claim 2, wherein the communication device is a device selected from a group comprising: fax machine, voice mail system, selective call receiver, a mobile phone with an SMS receiver, an audio device, a text-to-voice converter with a speaker, personal computer with electronic mail.

4. The computer system of claim 2, wherein the communication device presents the representation visually or audibly.

5. The computer system of claim 4, wherein the communication device runs a browser program.

6. The computer system of claim 5, wherein the communication device presents the representation as a hyperlink to a full version of the notification message.

7. The computer system of claim 2, wherein the central computer assigns a unique identification number to the notification message, and wherein the communication device returns the identification number as part of the receipt message.

8. The computer system of claim 7, wherein the communication device also returns a user identification to the central computer.

9. The computer system of claim 8 wherein the central computer stores the user identification.

10. The computer system of claim 1, wherein the central computer is implemented as a workplace application server by that the users of the group interact with applications running on the at least one peripheral computer.

11. The computer system of claim 10, wherein the workplace application server adds a follow-up suggestion to the notification message, the description being selected from a look-up table.

12. The computer system of claim 1, wherein the further notification message has a descriptive portion to indicate being the further notification.

13. The computer system of claim 1, wherein the notification message comprises predefined text portions.

14. The computer system of claim 1, wherein the notification message comprises dynamically adapted text portions that relate to the business application where the current value of the predetermined variable is in the predetermined relation to the reference value.

15. An alert notification method for a central computer, the method comprising the following steps:

deriving a group of users from a role-to-user assignment and from an application-to-role assignment, the assignment defining at least one business application that each user is allowed to access;

storing representations of the group of users in a message distribution list and to receive subscription requests to alert notification messages from the users of the group;

receiving an alert message by the central computer, the alert message issued by at least one peripheral computer that executes the business application and that detects that a current value of a predetermined variable in the business application is in a predetermined relation to a reference value;

forwarding a notification message to a plurality of communication devices that present a representation of the notification to the group of users; and issuing a further notification message to a further user outside the group in the event that during a predetermined time period no user of the group has confirmed reception of the notification by a receipt message.

16. The method of claim 15, wherein the subscription requests selectively add and remove representations of users to and from the distribution list.

17. A computer program product with program instructions for a processor in a central computer, the computer program product tangibly embodied in computer readable storage medium, the central computer coupled to at least a peripheral computer that executes at least one business application, the peripheral computer issuing an alert message when a current value of a predetermined variable in the business application is in a predetermined relation to a reference value, the central computer for receiving the alert message, the computer program product having program instructions that cause the processor of the central computer to execute the following:

deriving a group of users from a role-to-user assignment and from an application-to-role assignment, wherein the assignment defines the business application that each user is allowed to access;

storing representations of the group of users in a message distribution list and to receive subscription requests to alert notification messages from the users of the group;

upon receiving the alert message, forwarding a notification message to a plurality of communication devices that present a representation of the notification to the group of users; and issuing a further notification message to a further user outside the group in the event that during a predetermined time period no user of the group has confirmed reception of the notification by a receipt message, the computer program product characterized in that the program instructions cause the processor to derive the group of users from a role-to-user assignment and from an application-to-role assignment, wherein the assignment defines the business application that each user is allowed to access.

* * * * *